US 6,672,686 B2

(12) United States Patent
Lubischer (10) Patent No.: US 6,672,686 B2
(45) Date of Patent: Jan. 6, 2004

(54) PUMPING APPARATUS FOR A VEHICLE BRAKE SYSTEM

(75) Inventor: Frank Lubischer, Boppard (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/092,071

(22) Filed: Mar. 5, 2002

(65) Prior Publication Data
US 2002/0125767 A1 Sep. 12, 2002

(30) Foreign Application Priority Data

Mar. 6, 2001 (DE) .......................... 101 10 658

(51) Int. Cl.[7] ............................ F04B 53/00; B60T 17/02
(52) U.S. Cl. ....................... 303/116.4; 60/533; 417/273
(58) Field of Search ........................ 417/470, 535, 417/297, 298, 468, 273; 303/116.4

(56) References Cited

U.S. PATENT DOCUMENTS

| 4,962,972 A | 10/1990 | Pizzo ...................... 303/116.4 |
| 5,213,482 A * | 5/1993 | Reinartz et al. ............. 417/273 |
| 6,199,962 B1 * | 3/2001 | Dokas et al. ............. 303/116.4 |
| 6,350,107 B1 * | 2/2002 | Hamutcu .................... 417/273 |
| 6,446,435 B1 * | 9/2002 | Willmann et al. ............ 60/533 |

* cited by examiner

Primary Examiner—Matthew C. Graham
(74) Attorney, Agent, or Firm—MacMillan, Sobanski & Todd, LLC (57) ABSTRACT

The fundamental approach of the present invention is to dispose bushes, in which pistons of a pumping apparatus for a vehicle brake system are movably disposed, in such a movable manner that they themselves may in dependence upon movements of the pistons act as pistons in order to supply brake fluid to the vehicle brake system. In particular, the bushes, whose pistons are pumping brake fluid into an associated brake circuit, do not act as pistons. On the other hand, brake fluid is fed back into a brake circuit by bushes, whose pistons are pumping substantially no brake fluid into the brake circuit but are taking in e.g. brake fluid removed from the vehicle brake system in order subsequently to pump it back into the brake circuit.

18 Claims, 7 Drawing Sheets

PUMPING APPARATUS FOR A VEHICLE BRAKE SYSTEM

CROSS REFERENCE TO RELATED APPLICATIONS

This application claims foreign priority benefits of German Patent Application No. 10110658.0 filed Mar. 6, 2001.

1. Field of the Invention

The present invention relates generally to vehicle brake systems and specifically to a pumping apparatus for a vehicle brake system, which is capable of compensating pressure differences in brake circuits and different pumping capacities for brake circuits.

2. Background of the Invention

In vehicle brake systems, which comprise e.g. an antilock braking system (ABS), electronic/hydraulic brake assist (EBA/HBA), a traction control system (TCS), an electronic stability program (ESP), vehicle stability control (VSC) and the like and/or are operated in conjunction with automatic cruise control (ACC), pumps associated with individual brake circuits are usually used in order in the event of a pressure reduction for reducing braking forces to pump fluid, which has flowed off from wheel brakes, back into the appropriate brake circuit.

Differing pumping capacities may give rise to differences between the brake pressures in the brake circuits. This may lead not only to an unwanted reduction of the vehicle deceleration produced by means of wheel brakes but also to unwanted or non-controllable driving states (e.g. "breaking away" or skidding of the vehicle). Especially in vehicle brake systems with a diagonal split, this may lead to undesirable or non-controllable yaw moments.

Thus, e.g. for a vehicle brake system having two brake circuits and an antilock braking system, radial piston pumps are used. The pumps are driven by means of an eccentric, which is seated on a shaft driven by an electric motor. In order to pump brake fluid back into the brake circuits, fluid accommodated in pressure chambers of the pumps is fed back by reducing the volume of the pressure chambers. Differing pumping capacities of the pumps may lead to the problems described above. Furthermore, the piston movements needed for operation are, particularly because of the eccentric drive, not linear. As a result, for example, pulsations of a brake pedal during operation of the antilock braking system are influenced in a manner which is undesirable and also perceptible to a motor vehicle driver.

From U.S. Pat. No. 4,962,972 it is known in a pumping apparatus for a vehicle brake system to dispose bushes, which may move in dependence upon piston movements, movably in a housing. Pistons, which are movably disposed in the bushes, are moreover provided.

SUMMARY OF THE INVENTION

An object of the present invention is to provide an apparatus for compensating the pressure in brake circuits of a vehicle brake system. In particular, the present invention is to enable pressure compensation between brake circuits of a controlled vehicle brake system when, during operation of the latter, brake fluid is fed back into the brake circuits.

The fundamental approach of the present invention is to dispose bushes, in which pistons of a pumping apparatus for a vehicle brake system are movably disposed, in such a movable manner that they themselves, in dependence upon movements of the pistons, act as pistons in order to supply brake fluid to the vehicle brake system. In particular, the bushes are designed to be movable in such a way that, in response to piston movements, they deliver brake fluid into a brake circuit of the vehicle brake system, in which no brake fluid is displaced as a result of a pumping operation caused by the pistons themselves. This means that bushes, whose pistons are delivering brake fluid into an associated brake circuit, do not act as pistons, while bushes, whose pistons are delivering substantially no brake fluid into an associated brake circuit but are e.g. taking in brake fluid removed from the vehicle brake system in order subsequently to pump it back into the brake circuit, are moved in such a way that they develop a pumping action for said brake circuit.

In said manner brake fluid is supplied to brake circuits, into which no brake fluid is pumped by their associated pistons. As a result, during each pumping operation caused by a piston brake fluid is pumped into all of the brake circuits connected to the pumping apparatus according to the invention, and indeed is pumped irrespective of whether the associated pistons are pumping back brake fluid or not, because in the case of the latter the appropriate bushes act as pistons.

In order during a pumping operation caused by pistons to supply substantially the same quantity of brake fluid to each brake circuit and hence avoid pressure differences between the brake circuits, the bushes in dependence upon piston movements, which deliver brake fluid back into brake circuits, are moved in such a way that the brake fluid volumes displaced by the bushes correspond to the volumes, which are pumped back by the pumping pistons.

If different pressures are to exist in brake circuits of a vehicle brake system, the bushes are to be designed in such a way that their movements in response to movements of pumping pistons result in a displacement of greater and/or smaller brake fluid volumes.

The present invention is also based on the realization that (unwanted) pressure differences in brake circuits of a vehicle brake system caused by different pumping capacities of associated pumping devices may be compensated by throttling the supply of brake fluid to pumping devices of a higher pumping capacity. According to the invention such throttling is effected by movements of the bushes, thereby avoiding additional devices and/or measures for detecting pressures in brake circuits and pumping capacities as well as for throttling the supply of brake fluid.

BRIEF DESCRIPTION OF THE INVENTION

The present invention specifically provides a pumping apparatus for a vehicle hydraulic or pneumatic brake system, which apparatus comprises a housing and pistons movably disposed therein. The pistons are movably disposed in each case in bushes, which in turn are disposed in the housing so as to be movable in dependence upon piston movements.

According to the invention the bushes cooperate in such a way that movements of a bush, whose piston is moved in the sense of an operation whereby brake fluid is pumped into a brake circuit of the vehicle brake system, give rise to movements of the other bush(es).

Said active connection between the bushes may be achieved by mechanically connecting the bushes or integrating the latter into a constructional unit. It is further provided to use actuating members, which are disposed on the bushes and which in dependence upon movements of the bushes may establish active connections between the latter in order to transmit forces for movements of the bushes.

The cooperating bushes preferably form a plunger piston, which acts in the housing.

In particular, the bushes with the pistons disposed therein each delimit a pressure chamber, wherein each bush forms an outlet chamber in the housing. In dependence upon piston movements fluid connections between the pressure chambers and associated outlet chambers are established and interrupted. For said purpose non-return valves may be used, which open or close the outlet openings of the pressure chambers.

To enable brake fluid to be supplied to brake circuits of the vehicle brake system, which are in communication with an outlet chamber, of which the fluid connection to the corresponding pressure chamber has been interrupted, the plunger piston and, in particular, the bush forming such an outlet chamber is disposed in such a movable manner that it acts in said outlet chamber as a piston and pumps brake fluid into the associated brake circuit.

Preferably, elastic restoring elements such as e.g. restoring springs for the bushes are used, which counteract forces of motion caused by piston movements. By said means inoperative positions for the bushes and hence an inoperative position for the piston plunger are defined.

In one embodiment, the housing comprises two movably disposed pistons, which develop their pumping action for an associated brake circuit with a phase displacement of 180°. Accordingly, two bushes are used there, wherein the bush, whose piston is not moved in the sense of a pumping operation, acts in the housing as a piston in order to deliver brake fluid into the associated brake circuit.

In a further embodiment, the pumping apparatus comprises three bushes, which are movably disposed in the housing and in each of which a piston is movably disposed, wherein the pistons develop their pumping action for associated brake circuits with a phase displacement of 120°. In said embodiment the two bushes, whose pistons are not delivering brake fluid back into associated brake circuits, pump brake fluid back to the vehicle brake system, while the brake circuit fluidically connected to the pressure chamber of the pumping piston is supplied by the latter.

It is further provided that there is associated with each bush a throttling device, which in dependence upon movements of the pistons and of the corresponding bush limits the supply of brake fluid.

For said purpose the bushes may have supply bores, which are fluidically connected, e.g. via inlet chambers, to corresponding inlet openings. In dependence upon movements of the bushes relative to the housing movements of the supply bores relative to the inlet bores arise, with the result that a throttling of the supply of brake fluid may be caused.

The supply bores and the inlet bores are preferably disposed relative to one another in such a way that the supply of brake fluid occurs in dependence upon bush movements. Thus, for example, it is provided that a significant throttling of the supply of brake fluid occurs only when the corresponding bush has moved far enough.

It is further to be preferred that the supply bores and the inlet bores are disposed and/or the bushes are movable in such a way that the supply of brake fluid is throttled for the piston, which compared to the other piston(s) has a higher pumping capacity.

A further advantage arises when the supply bores and the inlet bores are movable relative to one another in such a way that the supply of brake fluid is improved for the piston(s), which compared to the other pistons has a lower pumping capacity. In combination with the throttling action for the piston of a higher pumping capacity, this leads to a faster compensation of (unwanted) differences between the brake fluid volumes delivered back into the brake circuits.

DETAILED DESCRIPTION OF THE INVENTION

Figure 1:
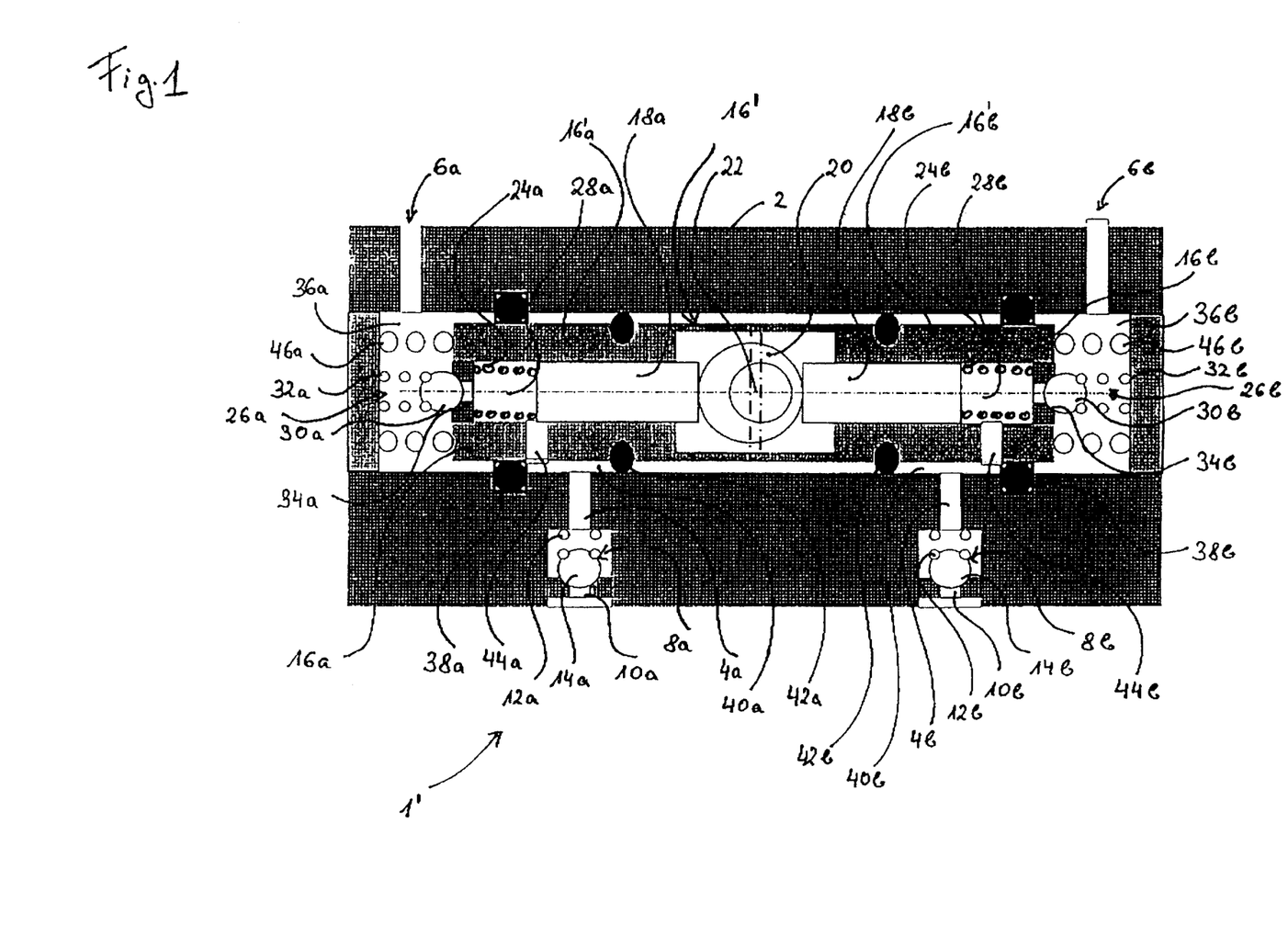
FIG. 1 a diagrammatic view of an embodiment of the pumping apparatus according to the invention, FIG. 2 a diagrammatic view of a further embodiment of the pumping apparatus according to the invention, FIG. 3 a diagrammatic view of a vehicle brake system having the pumping apparatus according to the invention as shown in FIG. 1 or FIG. 2, FIG. 4 a diagrammatic representation of a function, which shows the relationship between brake pedal speeds and additional braking forces generated by the vehicle brake system of FIG. 3 for assisting a vehicle driver (brake assist functionality), FIG. 5 a diagrammatic representation of functional relationships during operation of the vehicle brake system of FIG. 3, FIG. 6 a diagrammatic representation of a function, which illustrates the characteristics as a function of time of braking forces provided by the vehicle brake system of FIG. 3, and FIG. 7 a diagrammatic view of a further embodiment of the pumping apparatus according to the invention.
Figure 2:
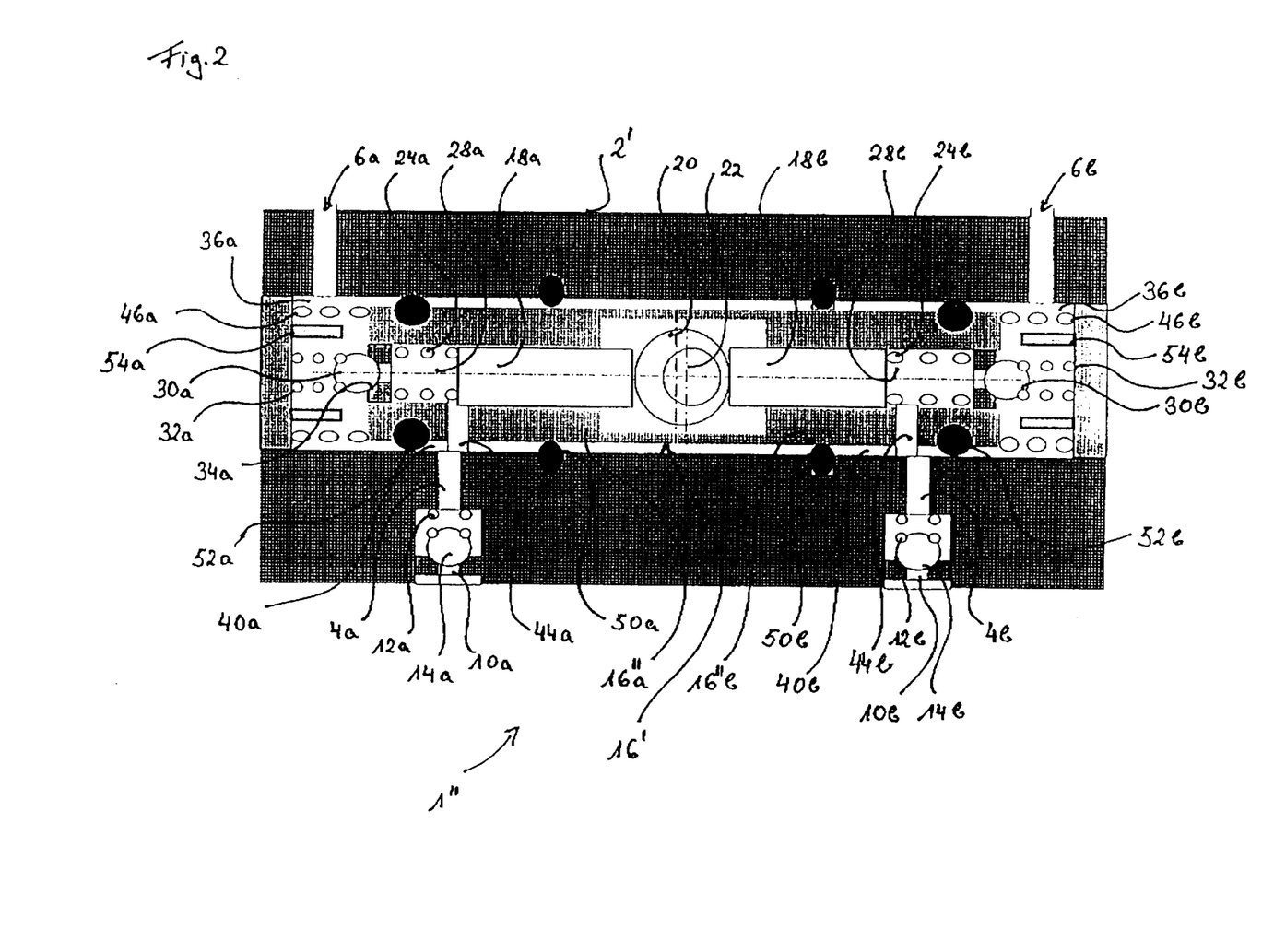

The embodiments illustrated in FIGS. 1 and 2 are used as a pumping apparatus in order during a controlled operation of a vehicle brake system to pump brake fluid discharged from brake circuit regions, in which brake pressure is being reduced, into brake circuit regions, in which pressure is being built up for the braking of vehicle wheels.

In the embodiment of a pumping apparatus 1' illustrated in FIG. 1, inlet bores 4a and 4b and outlet bores 6a and 6b are disposed in a housing 2. The inlet bores 4a and 4b are each connected to fluid lines of a brake circuit, via which in the event of a pressure reduction brake fluid is removed from corresponding wheel brakes. To prevent brake fluid, which is supplied via the inlet bores 4a and 4b, from flowing back into the said fluid lines of the brake circuits, which hereinafter are referred to in an abbreviated form as the output side of the brake circuits, non-return valves 8a and 8b associated with the inlet bores 4a and 4b are disposed in the housing 2. The non-return valves 8a and 8b each close an inlet 10a and 10b connected in each case to an output side of the brake circuits in that spring elements 12a and 12b press sealing elements 14a and 14b, which are shown here in the shape of a ball, sealingly against sealing seats 16a and 16b. When the output-side pressure in at least one of the brake circuits exceeds a predetermined value, the ball(s) 14a/14b is (are) lifted off its (their) sealing seat(s) 16a/16b and brake fluid may flow through the inlet bores 4a and 4b.

The outlet bores 6a and 6b are each connected to fluid lines of the brake circuits, which supply brake fluid to one or more wheel brakes for braking the vehicle.

In the housing 2 a bush 16'a, which receives the piston 18a, and a bush 16'b for receiving the piston 18b are movably disposed. The bushes 16'a and 16'b form a plunger piston 16, which may act in the housing 2. The function of the plunger piston 16', shown here as a single piece, may alternatively be provided by two bushes, which are constructed separately for the pistons 18a and 18b and mechanically connected to one another. The bushes 16'a and 16'b may also comprise actuating members, which in dependence upon movements of the bushes 16'a and 16'b may establish active connections between the latter. The pistons 18a and 18b may be moved to and fro, according to FIG. 1 to the left and right, in the bushes 16a and 16b, wherein the plunger piston 16' may move substantially parallel to the possible directions of motion of the pistons 18a and 18b.

The pistons 18a and 18b are actuated (moved to and fro) by means of an eccentric 20, which is seated on a shaft 22 of a non-illustrated drive. Restoring spring elements 24a and 24b for the pistons 18a and 18b are used to move back the piston 18a (according to FIG. 1 to the right) and the piston 18b (according to FIG. 1 to the left) in dependence upon the position of the eccentric 20.

In its axial end regions the plunger piston 16' has non-return valves 26a and 26b, which together with the bushes 16a and 16b and the pistons 18a and 18b delimit in each case pressure chambers 28a and 28b. The non-return valves 26a and 26b comprise in each case sealing elements 30a and 30b and compression springs 32a and 32b, which hold the sealing elements 30a and 30b, shown here in the shape of balls, against sealing seats 34a and 34b in order to prevent brake fluid from coming in. If the pressure generated in the pressure chambers 28a and 28b because of a movement of the pistons 18a and 18b exceeds a predetermined value, the sealing elements 30a and 30b are lifted off their sealing seats 34a and 34b, i.e. the non-return valves 26a and 26b are opened, and brake fluid may flow into outlet chambers 36a and 36b. Because of the pressures generated in the outlet chambers 36a and 36b as a result of movements of the pistons 18a and 18b, brake fluid may then flow through the outlet bores 6a and 6b into the corresponding inlet-side fluid lines of the brake circuits.

By means of sealing members 38a and 38b, which are disposed in a stationary manner on the housing 2, the outlet chambers 36a and 36b are separated from inlet chambers 40a and 40b in such a way that there is no direct fluid connection between said chambers. For separating the inlet chambers 40a and 40b, here two sealing members 42a and 42b are disposed in a stationary manner on the plunger piston 16'. Alternatively, for said purpose it is provided that only one sealing member is used, which is disposed e.g. centrally on the plunger piston 16'.

Via the inlet bores 4a and 4b brake fluid may flow into the inlet chambers 40a and 40b when the non-return valves 8a and 8b are open. Via supply bores 44a and 44b hydraulic fluid may flow out of the inlet chambers 40a and 40b into the pressure chambers 28a and 28b until the supply bores 44a and 44b are closed as a result of movements of the pistons 18a and 18b (according to FIG. 1 movements of the piston 18a to the left and movements of the piston 18b to the right). Furthermore, the fluid connections between the inlet chambers 40a and 40b and the pressure chambers 28a and 28b may be interrupted when the plunger piston 16' is displaced in the housing 2 in such a way that the supply bore 44a or 44b is closed by the sealing members 38a or 38b.

There are moreover disposed in the housing 2 spring elements 46a and 46b, which act upon the axial end faces of the plunger piston 16' and inner surfaces of the housing 2 lying opposite said end faces. The spring elements 46a and 46b in dependence upon movements of the plunger piston 16' provide restoring forces for the latter and define an inoperative position of the plunger piston 16'. In the embodiment illustrated in FIG. 1, the spring elements 46a and 46b have an identical linear spring characteristic. It is however provided that the spring elements 46a and 46b have different spring characteristics, such as e.g. different linear spring characteristics, progressive spring characteristics or degressive spring characteristics. The design of the spring elements 46a and 46b and the resultant effects are explained below in the description of the operation of preferred embodiments.

In the embodiment of a pumping apparatus 1", which is illustrated in FIG. 2 and in which the components corresponding to the embodiment of FIG. 1 are provided with identical reference characters, for separating the pressure chambers 28a and 28b and the outlet chambers 36a and 36b sealing members are used, which in their arrangement and function differ from the sealing members 38a and 38b as well as 42a and 42b. Sealing members 50a and 50b, which prevent a fluid connection between the pressure chambers 28a and 28b, are disposed in a stationary manner in the interior of the housing 2 and effect sealing relative to a plunger piston 16", which comprises two bushes 16"a' and 16"b'.

Sealing members 52a and 52b are used to separate the pressure chamber 28a from the outlet chamber 36a as well as the pressure chamber 28b from the outlet chamber 36b. The sealing members 52a and 52b are disposed in a stationary manner on the exterior of the plunger piston 16" and effect sealing relative to the inner surfaces of the housing 2. The sealing members 52a and 52b may prevent a supply of brake fluid to the pressure chambers 28a or 28b when they, as a result of a movement of the plunger piston 16", close the inlet bore 4a or the inlet bore 4b. Only brake fluid situated in the inlet chamber 40a or the inlet chamber 40b may then flow into the pressure chambers 28a or 28b.

The embodiment illustrated in FIG. 2 moreover differs from the embodiment illustrated in FIG. 1 in that it has two stop elements 54a and 54b. The stop elements 54a and 54b are disposed on inner surfaces of the housing 2, which lie opposite the axial end faces of the plunger piston 16" and are used to limit movements of the latter. The stop elements 54a and 54b moreover guarantee that the non-return valves 26a and 26b work properly when the plunger piston 16" is displaced according to FIG. 2 to the right or left in such a way that, in the absence of the stop elements 54a and 54b, the sealing elements 30a or 30b as a result of contact with the inner surfaces of the housing 2 come sealingly into abutment with the sealing seat 34a or 34b. The stop elements 54a and 54b moreover prevent damage of the non-return valves 26a and 26b upon such movements of the bush 16. Said two last-mentioned functions of the stop elements 54a and 54b play a subordinate role since reliable operation of the non-return valves 26a and 26b and protection of the latter from damage may be achieved by other constructional measures and/or by choosing a suitable type of non-return valve.

The pumping apparatuses 1' and 1" shown in FIGS. 1 and 2 differ from conventional apparatuses used to deliver brake fluid back into input sides of brake circuits substantially in that the pistons 18a and 18b are disposed movably in a plunger piston, which in turn is itself movable relative to the moving pistons 18a and 18b. In contrast to this, known pumps use piston-receiving devices, such as e.g. bushes, which are stationary in relation to pistons which are disposed movably therein.

There now follows a description of the operation of the pumping apparatuses 1'/1" of FIG. 1 and FIG. 2.

In dependence upon the operating state of a vehicle brake system connected to the pumping apparatus 1'/1" brake fluid is conveyed at the outlet side of brake circuits, which are connected to the inlets 10a and 10b, via the non-return valves 8a and 8b and the inlet bores 4a and 4b into the inlet chambers 40a and 40b.

By means of the eccentric 20 the pistons 18a and 18b are moved to and fro so that in dependence upon the positions of the pistons 18a and 18b brake fluid flows out of the inlet chambers 40a and 40b through the supply bores 44a and 44b into the pressure chambers 28a and 28b or via the non-return valves 26a and 26b into the outlet chambers 36a and 36b. From there, the brake fluid flows through the outlet bores 6a and 6b into the inlet sides of the brake circuits.

Because of the arrangement of the pistons 18a and 18b and their actuation by the eccentric 20 a phase displacement of 180° arises for the pumping devices formed by said pistons.

In conventional pumps, in which pistons operate with a phase displacement of 180° and are disposed in a comparable manner relative to one another but not in movable bushes which are connected to one another, the brake fluid is pumped back alternately into the brake circuits. Consequently the pressure distribution in the brake circuits is also different, since the pistons alternately pump back brake fluid in order to increase the pressures in the brake circuits. The different pressure distribution in the brake circuits may lead e.g. to undesirable or uncontrollable yaw rates for a vehicle, especially when a brake system with a diagonal split is used. Furthermore, such conventional pumps are not capable of providing a pressure build-up in brake circuits during a controlled operation of a vehicle brake system (e.g. in the form of brake assist, for traction control, for vehicle stability control, automatic cruise control and the like) because in said case the pressure build-up in the brake circuits is usually supposed to be effected substantially in synchronism in order to avoid unwanted pressure differences in brake circuits.

In contrast, the fundamental approach of the embodiments illustrated in FIGS. 1 and 2 makes it possible to overcome said drawbacks. Furthermore, the use of the pumping apparatus 1'/1" instead of conventional pumps, which are generally used as return pumps for vehicle brake systems with ABS, makes it possible to provide functions, which were previously unavailable or which previously required additional components for vehicle brake systems. By virtue of the movable arrangement of the plunger piston 16'/16" in the housing 2 and relative to the pistons 18a and 18b, the plunger piston 16'/16" moves counter to the direction of motion of the pistons 18a and 18b when the pressure generated by one of the pistons 18a and 18b is higher than the pressure generated by the other piston. This leads to a pressure compensation of the pressures generated by the pistons 18a and 18b, with the result that the pressure distribution in the brake circuits is substantially identical. Accordingly, a substantially synchronous pressure increase of substantially equal magnitude is achieved in the brake circuits. In said case, the pressure in each of the brake circuits is increased substantially by half of the pressure made available by the pumping piston 18a/b.

If, for example, the piston 18a is moved by the eccentric 20 to the left for the pressure build-up, and if the forces acting upon the plunger piston 16'/16" in the outlet chamber 36a are greater than the forces acting in the outlet chamber 36b, the plunger piston 16'/16" moves to the right. Thus, the plunger piston 16'/16" acts like a piston, which pumps brake fluid situated in the outlet chamber 36b through the outlet 6b into the brake circuit connected to the latter. In said case, the outlet chamber 36b serves as a pressure chamber for the plunger piston 16'/16". A corresponding sequence occurs upon a movement of the piston 18b to the right.

For operating states, in which the forces acting upon the plunger piston 16'/16" in the outlet chambers 36a and 36b are of substantially equal magnitude, the springs 46a and 46b ensure that the plunger piston 16'/16" is brought into its inoperative position and/or is held there. The springs 46a and 46b may further be used to vary the dynamic development of the pressure compensation provided by the plunger piston 16'/16".

Thus, for example, progressive or degressive springs may be used to achieve movements of the plunger piston 16'/16", wherein movements of the plunger piston 16'/16" because of existing pressure differences are initially smaller and subsequently become greater or vice versa. In the case of initially small, subsequently increasing displacements of the plunger piston 16'/16", initially small pressure differences are compensated to a lesser extent than subsequent, larger pressure differences. In dependence upon the characteristics of the springs 46a and 46b it is therefore possible not only to arrange for pressure compensation but also in the event of greater pressure differences to generate higher pressures in the outlet chamber, in which the plunger piston 16'/16" is acting as a piston, than in the outlet chamber, in which the pressure is generated by one of the pistons 18a or 18b.

It is further possible to design the springs 46a and 46b in such a way that the plunger piston 16'/16" is displaced to a greater extent for initially small pressure differences than for subsequent, larger pressure differences. In said manner the previously described pressure increase is generated by the plunger piston 16'/16" for initially small pressure differences, whereas subsequently larger pressure differences are compensated to a slight extent.

Alternatively or additionally the springs 46a and 46b may be so dimensioned that the plunger piston 16'/16" reacts more sensitively to pressure differences because of a pumping operation of one piston than to pressure differences as a result of a pumping operation of the other piston. Thus, for example, it is possible to select for the spring 46b a spring constant, which is higher than the spring constant of the spring 46a. The plunger piston 16'/16" is consequently displaced to a lesser extent to the right, when the piston 18a is pumping brake fluid into the brake circuit connected to the outlet 6a and there are pressure differences between the outlet chambers 36a and 36b, than in the event of pressure differences because of a pumping operation of the piston 18b.

The thus enabled pressure compensation between brake circuits of a vehicle brake system is therefore not only an improvement in the use of a pumping apparatus 1' and 1" as a return pump in an ABS but also makes it possible to use said pumping apparatus in operating states of a vehicle brake system, in which in dependence upon and/or independently of a brake actuation by a vehicle driver brake pressures are to be built up in a controlled manner. Examples of this are vehicle brake systems, which operate as a brake assist and/or are used for traction control, vehicle stability control and/or vehicle dynamics control.

A further way, in which the embodiment shown in FIG. 2 differs from the embodiment of FIG. 1, is the arrangement of the supply bores 44a and 44b relative to the inlet bores 4a and 4b. As may be seen in FIG. 2, the supply bores 44a and 44b are arranged relative to the inlet bores 4a and 4b so as to be offset inwards in relation to the axial ends of the housing 2. If the differences between the brake fluid volumina supplied by the pistons 18a and 18b and the plunger piston 16'/16" acting in the previously described manner as a piston lie in a predetermined, e.g. between 0 and approximately 0.3 cm$^3$, movements of the bush 16 lead to displacements of the supply bores 44a and 44b relative to the inlet bores 4a and 4b which have substantially no influence upon the supply of brake fluid into the pressure chambers 28a and 28b. The brake fluid volumes supplied to the inlet chambers 40a and 40b and consequently to the pressure chambers 28a and 28b are accordingly substantially identical.

If the differences between the brake fluid volumes supplied through the outlet bores 6a and 6b to the brake circuits are greater, e.g. lie in a range between approximately 0.3 cm$^3$ and 1 cm$^3$, the plunger piston 16'/16" is moved further to the right or left. As a result, the supply bore 44a/b of the pressure chamber 28a/b, whose piston 18a/b is displacing a greater volume of brake fluid, is displaced relative to the associated inlet bore 4a/b in such a way that, there, the supply of brake fluid is throttled. As a result of the reduction of supplied brake fluid, the pressure chamber 28a/b with a higher pumping capacity has available a smaller quantity of brake fluid, which may be delivered during the next pumping operation into the corresponding brake circuit. In contrast, the supply of brake fluid to the pressure chamber 28a/b with a smaller pumping capacity is not throttled because the position of its supply bore 44a/b relative to the associated inlet bore 4a/b does not lead to any reduction of the supply of brake fluid. As a result, the pumping capacity of the pressure chamber 28a/b, whose pumping capacity is lower than the pumping capacity of the other pressure chamber 28/b, is held substantially constant. As a result of the maintaining of the pumping capacity, on the one hand, and the reduction of the pumping capacity, on the other hand, differences between the brake fluid volumes delivered via the outlet bores 6a and 6b and hence pressure differences in the brake circuits connected to the latter are compensated.

An improvement of said compensating function may be achieved when the supply bores 44a and 44b are disposed relative to the inlet bores 4a and 4b in such a way that, in the event of throttling of the supply of brake fluid to one of the pressure chambers 28a/b, the supply bore 44a/b of the other pressure chamber 28a/b assumes positions relative to its inlet bore 4a/b, which improve the supply of brake fluid. The improved brake fluid supply to the pressure chamber 28a/b with an initially lower pumping capacity increases its pumping capacity during subsequent pumping operations. Said increase of the pumping capacity is also attributable to the fact that the size of the pressure chamber 28a/b with a lower capacity is enlarged as a result of displacements of the plunger piston 16'/16" during pumping operations of the piston 18a/b, for which reason the pressure chamber 28a/b with a lower capacity may receive more brake fluid and deliver it during subsequent pumping operations into the corresponding brake circuit. The ranges, in which differences between the volumetric capacities of the pistons 18a and 18b and of the pressure chambers 28a and 28b do or do not give rise to throttling, are defined substantially by the arrangements of the supply bores 44a and 44b relative to the inlet bores 4a and 4b. The arrangements of the supply bores 44a and 44b relative to the inlet bores 4a and 4b also influence whether and to what extent, in the event of throttling of the brake fluid supply for one side, an improvement of the brake fluid supply for the other side may be achieved.

There now follows a description of the use of the embodiments illustrated in FIGS. 1 and 2 in a vehicle brake system with ABS and BA functionalities. In the vehicle brake system 100 diagrammatically illustrated in FIG. 3 two brake circuits 102 and 104 are activated by means of a tandem master brake cylinder 108, which cooperates with a brake booster 106, in response to an actuation of a brake pedal 110 by a vehicle driver. The brake circuits 102 and 104 are connected to wheel brakes 112, 114, 116 and 118, whose association with the individual wheels of a motor vehicle depends on whether the vehicle brake system 100 has a front axle/rear axle split, a diagonal split, a triangular split, a four-two-four split or a four-four split.

Figure 3:
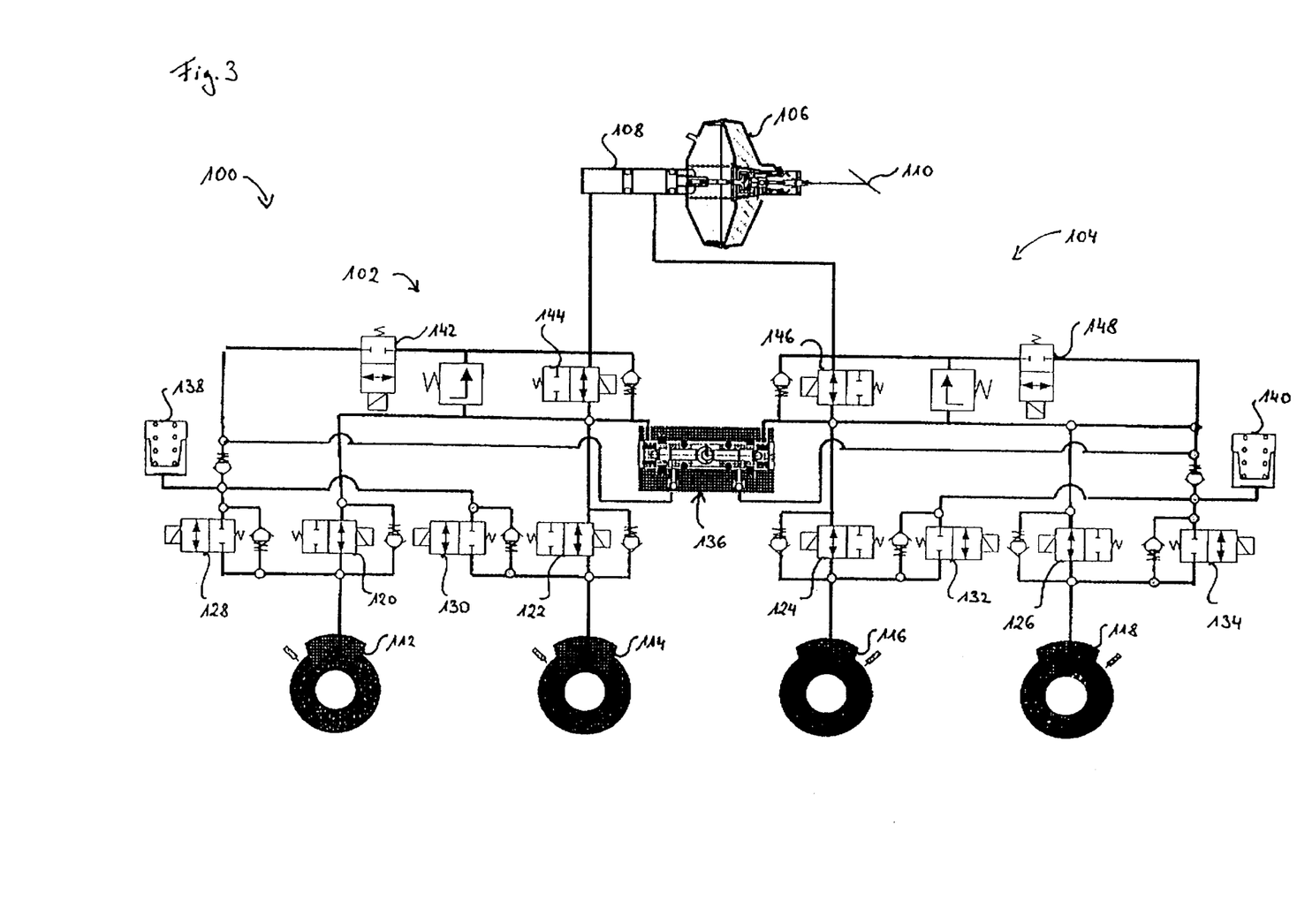

For the ABS functionality of the vehicle brake system 100, controllable inlet valves 120, 122, 124 and 126 as well as controllable outlet valves 128, 130, 132 and 134 are associated with the wheel brakes 112, 114, 116 and 118. A pumping apparatus 136, which was described in detail with reference to FIGS. 1 and 2, is connected to outlets of the outlet valves 128, 130, 132 and 134 and to inlets of the inlet valves 120, 122, 124 and 126.

Upon, as such, known control processes of the inlet and outlet valves 120 to 134 during an ABS operation the pumping apparatus 136 serves as a return pump in order in the event of a pressure reduction to pump brake fluid, which is removed from the wheel brakes 112, 114, 116 and/or 118, back into the brake circuits 102 and 104 at the inlet side for the inlet valves 120, 122, 124 and/or 126. In the present case, brake fluid to be pumped back may be brake fluid, which is removed directly from the wheel brakes 112, 114, 116 and/or 118, and/or brake fluid accommodated in compensating reservoirs 138 and 140.

The brake circuits 102 and 104 further comprise control valves 142, 144, 146 and 148, which are connected between the tandem master brake cylinder 108 and inlets of the inlet valves 120, 122, 124 and 126. The control valves 142 to 148 are used to control the supply of brake fluid from the tandem master brake cylinder 108 in order to generate braking forces needed for e.g. traction control, cruise control and/or vehicle stability control.

There now follows a description of the operation of the vehicle brake system 100 and, in particular, of the pumping apparatus 136 which provides the BA functionality. The use of the vehicle brake system 100 as brake assist assists a vehicle driver during braking operations in that in dependence upon an actuation of the vehicle brake system 100 by the vehicle driver additional braking forces are generated. In the case of the fundamental approach here, brake actuations by the vehicle driver are sensed immediately in that movements of the brake pedal 110 are detected. Said procedure opens up the possibility of proportional control of the vehicle brake system 100 in response to actuations of the brake pedal 110.

When actuations of the brake pedal 110, more precisely pedal speeds, exceeding a predetermined limit value are determined, additional braking forces are generated by means of the pumping apparatus 136. Thus, the vehicle driver is assisted in braking the motor vehicle because he does not have to summon up all of the required braking forces himself. Said procedure moreover allows assistance of the vehicle driver also during braking operations, which are not emergency braking operations, by means of which the motor vehicle is to be brought completely to a standstill, because an activation of the BA functionality does not lead to full actuation ("full braking") of the vehicle brake system 100.

Figure 4:
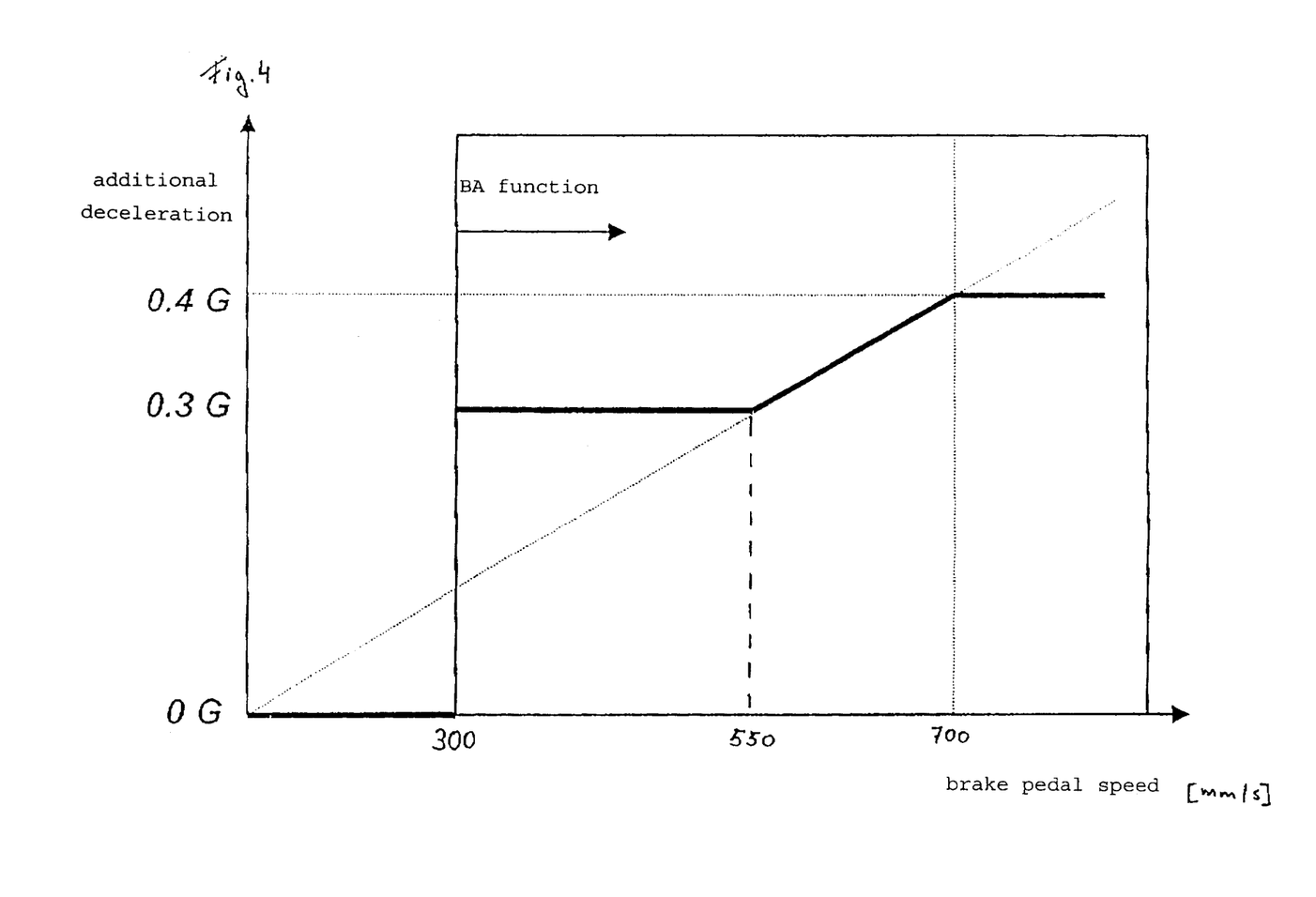

FIG. 4 shows a function, which by way of example describes the relationship of speeds of the brake pedal 110 and (negative) accelerations, which arise as a result of braking forces additionally generated by the pumping apparatus 136. Given brake pedal speeds lower than 300 mm/s, the BA functionality of the vehicle brake system 100 is not activated, i.e. the pumping apparatus 136 does not generate braking forces which are effective in addition to the braking forces generated by the tandem master brake cylinder 108. If the brake pedal speed exceeds a value of 300 mm/s, the pumping apparatus 136 is activated in order to generate braking forces, which lead to an additional negative acceleration of the motor vehicle by approximately 0.3 G.

Given brake pedal speeds between 300 and 550 mm/s, the additional braking forces generated by the pumping apparatus 136 remain substantially constant. If the brake pedal speeds exceed 550 mm/s, the braking forces generated by the pumping apparatus 136 are increased until, at brake pedal speeds of 700 mm/s, a negative motor vehicle acceleration of approximately 0.4 G is achieved. If the brake pedal speeds lie in a range above 700 mm/s, braking forces are generated by the pumping apparatus 136 in order to achieve additional negative acceleration of the vehicle by approximately 0.4 G.

In order during activating of the BA functionality of the vehicle brake system 100 to avoid unstable driving states and perceptible lateral movements of the motor vehicle, it is necessary for the additional braking forces generated by the pumping apparatus 136 to be provided substantially in synchronism and at an identical level to the wheel brakes 112, 114, 116 and 118. As explained with reference to FIGS. 1 and 2, this is guaranteed by the pressure compensation provided for the brake circuits 102 and 104 by the plunger piston 16'/16". In particular, this prevents yaw rates for the motor vehicle, which, when p is high, in a speed range between approximately 50 and 100 kph are not to exceed around 40 per second and at speeds above 100 kph are not to exceed around 30 per second.

In conventional vehicle brake systems for BA functionality, particularly in operating states where an ABS functionality is not yet activated it is necessary to compensate pressure differences in the brake circuits by means of additional measuring and control processes. This is not necessary in the vehicle brake system 100 because, there, such pressure differences in the brake circuits 102 and 104 are prevented by the pumping apparatus 136.

Figure 5:
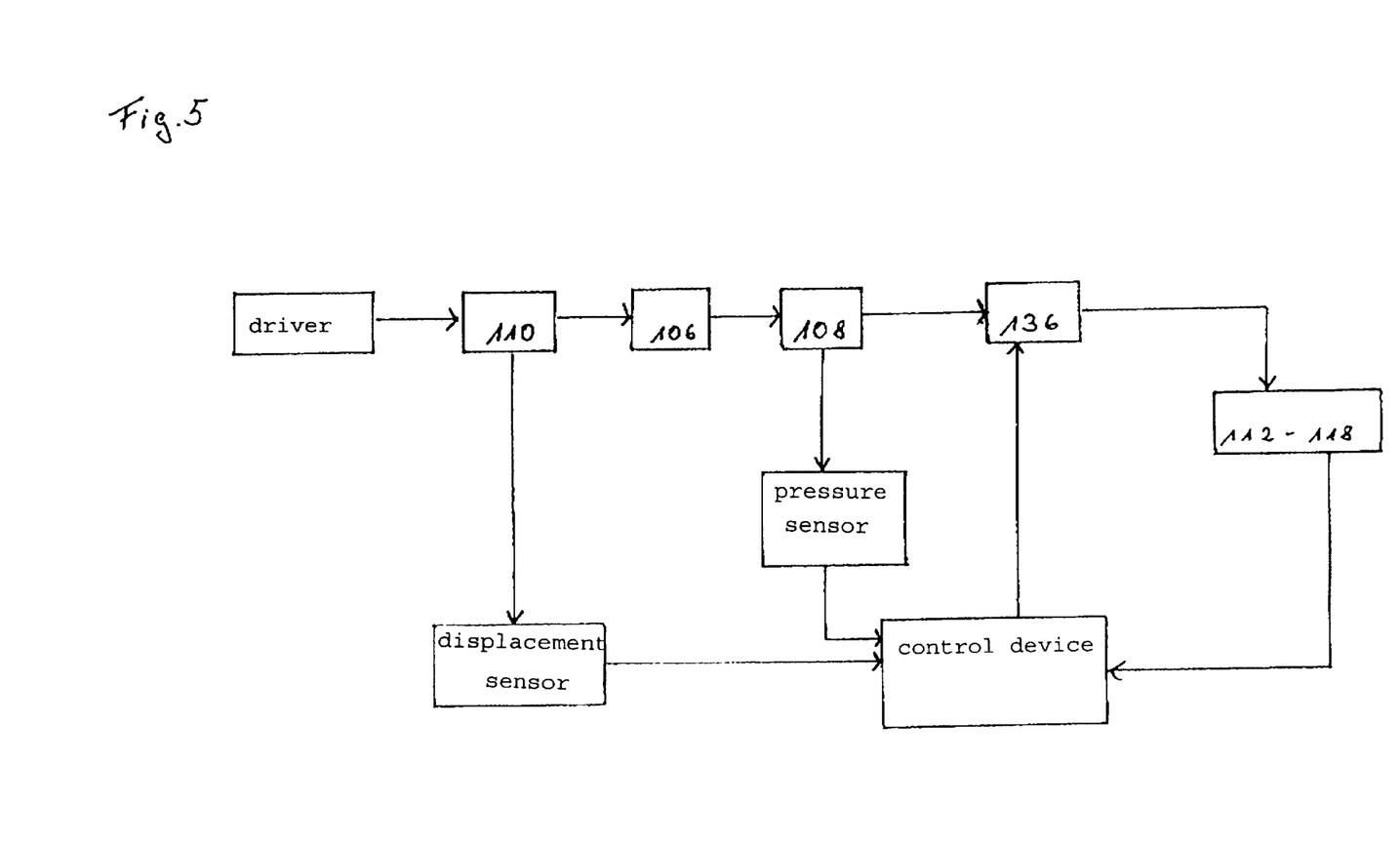

FIG. 5 shows a diagram, which illustrates the function blocks during operation of the vehicle brake system 100 upon activation of the BA functionality, wherein reference characters used in said diagram indicate components of FIG. 3.

A vehicle driver activates the tandem master brake cylinder 108 by means of the brake pedal 110 and the brake booster 106. The actuation of the brake pedal 110 and, in particular, its speeds are detected by a sensor, and the brake pressure generated by the tandem master brake cylinder 108 is measured by means of a pressure sensor. Values output by the displacement sensor and the pressure sensor are passed to a control device, which controls the pumping apparatus 136 during ABS and/or BA operation of the vehicle brake system 100. Given determination of a brake pedal speed at which, as described above, the BA functionality is to be activated, the control device in dependence upon the brake pressure generated by the tandem master brake cylinder 108 controls the pumping apparatus 136 in such a way that the brake pressure generated by the vehicle brake system 100 and supplied to the wheel brakes 112, 114, 116 and 118 is increased in a desired manner. On the other hand, the pumping apparatus 136 is not activated by the control device when the determined brake pedal speed lies below the defined limit value, so that the braking force generated by the vehicle brake system 100 is provided by the tandem master brake cylinder 108.

The control device is further used to provide the ABS functionality of the vehicle brake system 100. For said purpose, rotational speeds of the wheels, for example, are supplied to the control device in order to operate the pumping apparatus 136 in the manner described above as a return pump. In particular, the control devices and the pumping apparatus 136 are designed in such a way that the pumping apparatus 136 operates as a return pump also upon activation of the BA functionality.

Figure 6:
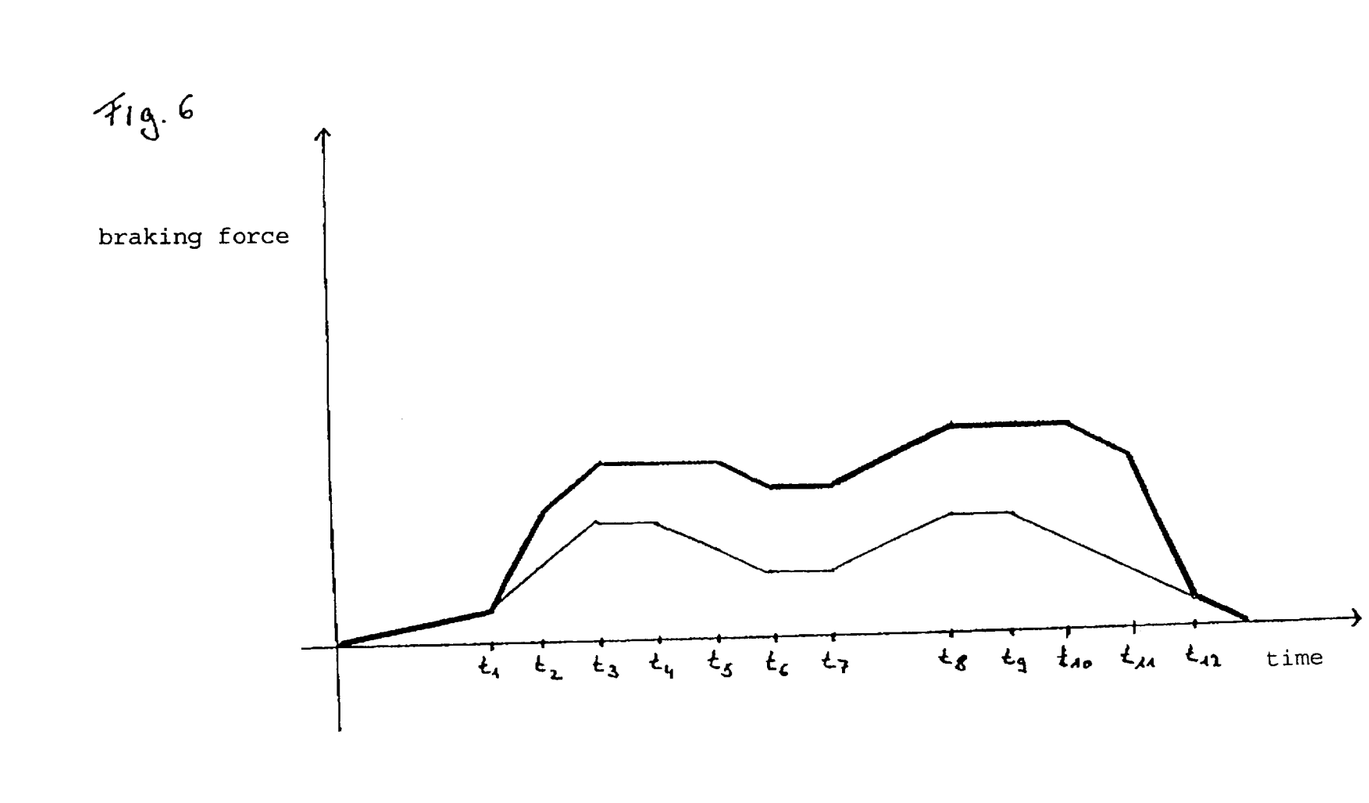

The curves illustrated by thick lines in FIG. 6 show the characteristics as a function of time of resulting braking forces of the vehicle brake system 100 upon activation of the BA functionality, while curves illustrated by thin lines show the characteristics as a function of time of braking forces, which are generated by a vehicle driver without activation of the BA functionality.

Up to a time $t_1$ there is a braking operation, in which speeds of the brake pedal actuated by the vehicle driver lie below the limit value, which leads to activation of the BA functionality. Accordingly, the braking forces generated by the vehicle brake system 100 are effected by the vehicle driver. When at the time $t_1$ a brake pedal speed exceeding the limit value (e.g. 300 mm/s) is determined, additional braking forces are generated by means of the pumping apparatus 136 so that the resulting braking forces are greater than those occasioned by the vehicle driver himself. After the time $t_1$ the pressures in the brake circuits 102 and 104 are increased by the pumping apparatus 136 until at a time $t_2$ the desired braking force increase is achieved, which leads e.g. to an additional negative acceleration for the motor vehicle of around 0.3 G. Subsequently the braking forces generated by the vehicle brake system 100 are increased, compared to a braking force which would be generated by the vehicle driver without BA functionality, by a predetermined value (e.g. 0.3 G). The curves extending between the time $t_2$ and a time $t_3$ accordingly run parallel. When the vehicle driver maintains the brake pedal actuation existing at the time $t_3$ up to a time $t_4$, the resulting braking force also remains constant.

Said braking force is maintained for a predetermined period even if the vehicle driver reduces the brake pedal actuation. Said "non-sensible" region of the vehicle brake system 100 is shown in FIG. 6 between the time $t_4$ and a time $t_5$. At the end of said period (e.g. 1 s) the braking force generated by the vehicle brake system 100 is also reduced in accordance with the brake pedal actuation by the vehicle driver, wherein the resulting braking force is increased compared to the braking force defined by the vehicle driver by a greater value than in the region between the times $t_2$ and $t_3$. Said greater braking force increase is attributable to the maintaining of the resulting braking force in the "non-sensible" region.

If after the time $t_6$ the brake pedal actuation remains constant up to a time $t_7$, the braking force generated by the vehicle brake system 100 is also held constant. For the region between the time $t_7$ and a time $t_8$ the braking force generated by the vehicle brake system 100 follows the braking force defined by the vehicle driver, wherein the braking force increase, in a comparable manner to the regions between the times $t_5$ and $t_6$ as well as between the times $t_6$ and $t_7$, is greater than the braking force increase, which exists in the regions between the times $t_2$ and $t_3$ as well as between the times $t_3$ and $t_4$.

After a region, which ends at a time $t_9$ and in which because of a constant brake actuation the braking force generated by the vehicle system 100 is constant, there is a further "non-sensible" region, in which the resulting braking force is maintained even though the vehicle driver reduces the brake pedal actuation. At the end of the period defined for the "non-sensible" region the resulting braking force follows the definition by the vehicle driver in a region between times $t_{10}$ and $t_{11}$.

If the reduction of the brake pedal actuation by the vehicle driver leads to a reduction of the braking force to below a predetermined value, the BA functionality is deactivated. For said purpose, the pumping apparatus 136 is operated in such a way that it does not generate any additional brake pressure in the brake circuits 102 and 104. The brake pressure in the vehicle brake system 100 is accordingly reduced until the resulting braking force at a time $t_{12}$ corresponds to the braking force defined by the brake pedal actuation of the vehicle driver.

Besides the use of the pumping apparatus 136 for an ABS and/or BA operation of the vehicle brake system 100, the pumping apparatus 136 may be used to generate braking forces needed for automatic cruise control (ACC). Here, unlike for a BA operation, braking forces are generated by the pumping apparatus 136 without actuations of the brake pedal 110 by the vehicle driver being required. If, for example, a motor vehicle is to be moved at a predetermined speed, the pumping apparatus 136 is activated to generate brake pressures in the brake circuits 102 and 104 in order to maintain the defined speed when the motor vehicle is situated e.g. on an inclined road.

During testing of the vehicle brake system 100 illustrated in FIG. 3 pressures between 0 and approximately 100 bar were generated by the pumping apparatus 136, wherein upon activation of the BA functionality pressures in the region of around 100 bar were generated. During operation of the pumping apparatus 136 for cruise control, the pressures were in the region of around 35 bar.

With regard to the previously described plunger piston 16'/16" illustrated in FIGS. 1 and 2, during the pressure compensation between the brake circuits 102 and 104 (FIG. 3) pressure differences, which resulted from differences of around 0.3 cm³ between the brake fluid volumes supplied by the pistons 18a and 18b to the brake circuits 102 and 104, were compensated within approximately 60 milliseconds. In said case, the plunger piston 16'/16" was displaced so far to the left or right that it acted in the outlet chamber 36a or 36b in the previously described manner as a piston, with the result that substantially identical brake fluid volumes were supplied to the brake circuits 102 and 104 and the pressure rises in the brake circuits 102 and 104 substantially matched. Said movements of the plunger piston 16'/16" still did not lead to the previously described throttling of the supply of brake fluid into the pressure chambers 28a and 28b because said movements of the plunger piston 16'/16" did not lead to a displacement of the supply bores 44a or 44b relative to the inlet bores 4a or 4b, which lead to said throttling.

Greater differences between the brake fluid volumes supplied by the pistons 18a and 18b to the brake circuits 102 and 104, which in the experimental checks lay in the region of around 1 cm³, gave rise to movements of the plunger piston 16'/16", which led not only to the described pressure compensation but also to throttling of the supply of brake fluid to the pressure chambers 28a or 28b. As described above, the greater differences between the volumetric capacities of the pistons 18a and 18b led to greater displacements of the plunger piston 16'/16". Thus, the supply bore 44a/b of the pressure chamber 28a/b, whose piston 18a/b was supplying a higher quantity of brake fluid to the corresponding brake circuit 102/104, was displaced relative to the associated inlet bore 4a/b in such a way that the supply of brake fluid was throttled. In said case, throttling of around 33% and above was achieved. On the other hand, the supply bore 44a/b of the pressure chamber 28a/b, whose piston was delivering a lower volume of brake fluid into the corresponding brake circuit 102/104, was positioned relative to the associated inlet bore 4a/b in such a way that the supply of brake fluid was improved. During the tests differences of around 0.3 cm³ to around 1 cm³ between the brake fluid volumes supplied by the pistons 18a and 18b to the brake circuits 102 and 104 were compensated within around 300 milliseconds.

Figure 7:
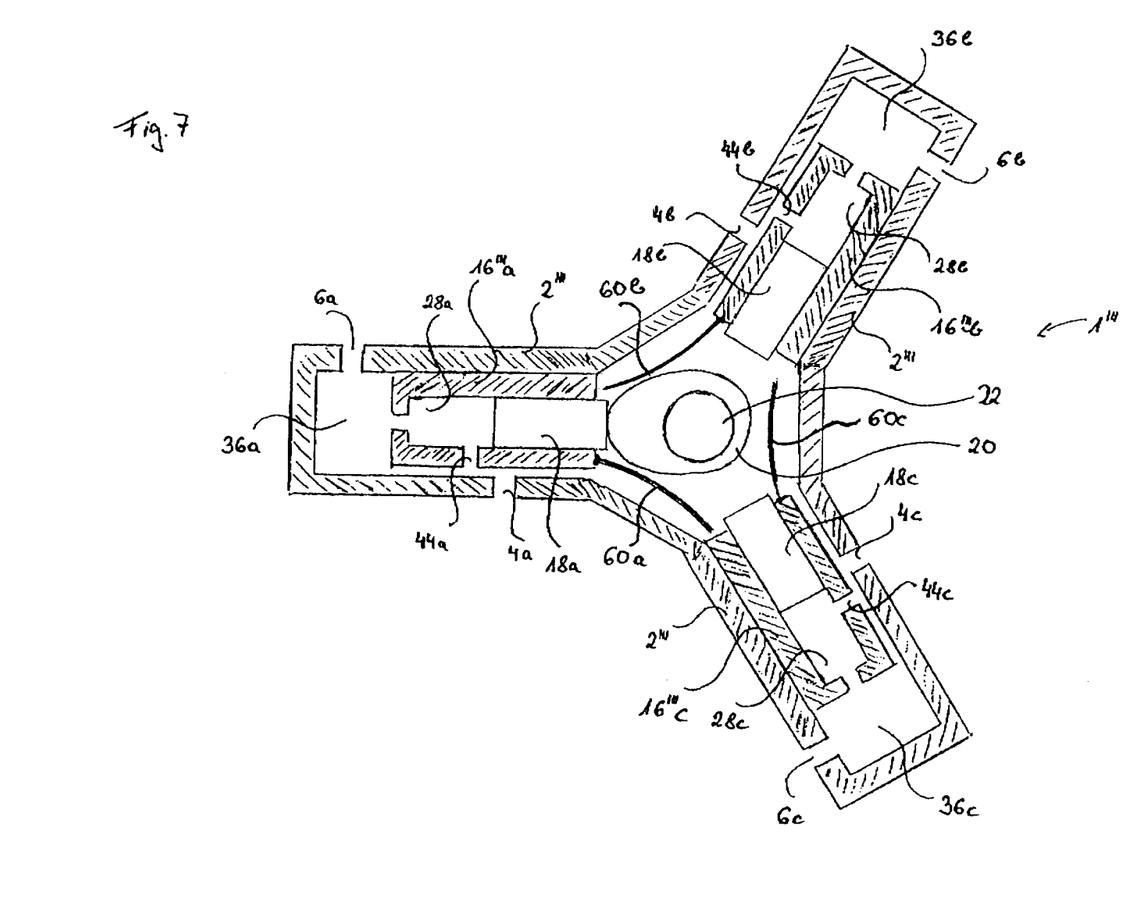

The operation and the mode of operation—particularly with regard to a pressure compensation between brake circuits and the brake fluid volumes supplied to the latter and with regard to the damping behaviour in the case of different pumping capacities—of the further embodiment shown in FIG. 7 substantially correspond to the embodiments of FIGS. 1 and 2. Components, which form part of the embodiment shown in FIG. 7 and the functions of which substantially correspond to the functions of corresponding components of the embodiments of FIGS. 1 and 2, are provided with identical reference characters. For the sake of clarity, the non-return valves, the springs, the sealing members and the sealing elements are not shown in FIG. 7.

A pumping apparatus 1''' diagrammatically reproduced in FIG. 7 comprises a star-shaped housing 2''', in which three bushes 16'''a, 16'''b and 16'''c are movably disposed. Pistons 18a, 18b and 18c movably disposed in the bushes 16'''a, 16'''b and 16'''c form pressure chambers 28a, 28b and 28c. The axial longitudinal axes of the bushes 16'''a, 16'''b and 16'''c and hence the directions of motion of the pistons 18a, 18b and 18c are mutually offset by around 120°. By means of a suitably shaped eccentric 20''', which is rotated by a shaft 22''', a phase displacement of 120° arises for pumping operations of the pump 1''', during which in each case one of the pistons 18a, 18b and 18c pumps brake fluid situated in the corresponding pressure chamber 28a/b/c into an associated brake circuit.

In order to achieve the damping described with reference to FIG. 2, the arrangements of the supply bores 44a, 44b and 44c relative to the inlet bores 4a, 4b and 4c are to be selected in the manner described above. The bushes 16'''a, 16'''b and 16'''c with their end regions, which lie opposite the shaft 22''', and with the housing 2''' delimit outlet chambers 36a, 36b and 36c.

The bushes 16'''a, 16'''b and 16'''c each comprise an actuation member 60a, 60b and 60c, respectively. A first end of the actuating member 60a is fixed to the bush 16'''a, and an other end of the actuating member 60a is disposed adjacent bush 16'''c. Similarly, a first end of the actuating member 60b is fixed to the bush 16'''b, and an other end of the actuating member 60b is disposed adjacent bush 16'''a, and a first end of the actuating member 60c is fixed to the bush 16'''c, and an other end of the actuating member 60c is disposed adjacent bush 16'''b. Because of the function of the actuating members 60a, 60b and 60c described below, the bushes 16'''a, 16'''b and 16'''c together with the actuating members 60a, 60b and 60c form a plunger piston 16''', which provides the previously described pressure compensation between brake circuits connected to the outlet chambers 36a, 36b and 36c. The movements of the plunger piston 16''' required for said purpose are effected by means of the actuating members 60a, 60b and 60c.

If the piston 18a moves in its bush 16'''a according to FIG. 7 to the left in order to deliver brake fluid situated in the pressure chamber 28a via the outlet chamber 36a into the associated brake circuit, the bush 16'''a moves to the right in the manner already described. In said case the bush 16'''a bears against a surface of the actuating member 60b and urges the actuating member 60b up and to the right, such that the bush 16'''b is displaced up to the right, with the result that the bush 16'''b in the outlet chamber 36b acts as a piston and pumps brake fluid situated there into the associated brake circuit. What is more, the actuating member 60a of the bush 16'''a bears against a surface of the bush 16'''c and urges the bush 16'''c down to the right, with the result that the bush 16'''c pumps brake fluid out of the outlet chamber 36c. If the bush 16'''b moves up to the right and the bush 16'''c moves down to the right, there is no contact between the actuating member 60c and the bush 16'''b, and there is no restraint in the movement of the bushes 16'''b and 16'''c respective to one another in these respective directions, because the actuating member 60c is connected to only one of the bushes 16'''b and 16'''c. As illustrated, the actuating to the bush 16'''c.

If the piston 18a moves as a result of a rotation of the eccentric 20''', which is effected e.g. in clockwise direction, the restoring springs (not shown here) for the bushes 16'''b and 16'''c move the latter back again, i.e. down to the left and up to the left. As a result, the actuating member 60c may be brought into active connection with the bush 16'''b. Upon an actuation of the piston 18c in order to pump brake fluid out of the pressure chamber 28c, the bush 16'''c moves up to the left and by means of its actuating member 60c displaces the bush 16'''b as well as the bush 16'''a by means of the latter's actuating member 60a. The resulting movements of the bush 16'''a to the left and of the bush 16'''b up to the right are possible because, in said case, the active connection of the actuating member 60b to the bush 16'''a is cancelled.

Corresponding sequences arise when the piston 18b is moved up to the right by the eccentric 20'' in order to deliver brake fluid out of the pressure chamber 28b.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Pumping apparatus for a vehicle brake system, comprising
    a housing,
    bushes movably disposed in the housing, and
    pistons movably disposed in the bushes, wherein the bushes are movable in dependence upon movements of the pistons,
    characterized in that
    the bushes cooperate in such a way that movements of one of the bushes in response to movements of the piston disposed therein give rise to movements of the other bushes.

2. Pumping apparatus according to claim 1, characterized in that the bushes are mechanically connected or integrated into a constructional unit.

3. Pumping apparatus according to claim 1, characterized in that the bushes have actuating members in order in dependence upon movements of the bushes to establish active connections between the latter.

4. Pumping apparatus according to claim 1, characterized in that the bushes act in the housing as a plunger piston.

5. Pumping apparatus according to claim 1, characterized in that
    the bushes with the pistons disposed therein delimit in each case a pressure chamber, and
    the bushes form in each case an outlet chamber in the housing.

6. Pumping apparatus according to claim 5, further including devices for establishing and interrupting fluid connections between the pressure chambers and associated outlet chambers in dependence upon movements of the pistons.

7. Pumping apparatus according to claim 6, characterized in that at least one of the outlet chambers acts as a pressure chamber for the bush, which forms said outlet chamber, when the fluid connection of said bush to the corresponding pressure chamber is interrupted.

8. Pumping apparatus according to claim 7, characterized in that the plunger piston acts as a piston in the at least one of the outlet chambers.

9. Pumping apparatus according to claim 1, further including restoring devices for the bushes.

10. Pumping apparatus according to claim 1, characterized in that the housing comprises two bushes, wherein the pistons of the latter operate with a phase displacement of 180°.

11. Pumping apparatus according to claim 1, characterized in that the housing comprises three bushes, wherein the pistons of the latter operate with a phase displacement of 120°.

12. Pumping apparatus according to claim 5, further including throttling devices associated with each bush for limiting the supply of brake fluid to the corresponding pressure chamber of the bush in dependence upon movements of the pistons.

13. Pumping apparatus according to claim 12, characterized in that the throttling devices limit the supply of brake fluid in dependence upon movements of the bushes.

14. Pumping apparatus according to claim 13, characterized in that the throttling devices throttle the supply of brake fluid when movements of the bushes exceed a defined range.

15. Pumping apparatus according to claim 12, characterized in that the throttling devices limit the supply of brake fluid to at least one of the pressure chambers, the piston of which having a higher pumping capacity compared to others of the pistons.

16. Pumping apparatus according to claim 12, characterized in that the throttling devices increase the supply of brake fluid to at least one of the pressure chambers, the piston of which having a lower pumping capacity compared to others of the pistons.

17. Pumping apparatus according to claim 1, characterized in that the pumping apparatus is a return pump for an antilock braking system.

18. Pumping apparatus according to claim 1, characterized in that the pumping apparatus is a brake fluid pump for the controlled build-up of braking forces in the vehicle brake system.

* * * * *